United States Patent
Imes et al.

(10) Patent No.: US 7,468,335 B2
(45) Date of Patent: Dec. 23, 2008

(54) HIGH-STRENGTH MELTBLOWN POLYESTER WEBS

(76) Inventors: Robert H. Imes, 1332 Heidi Haven Dr., Lawrenceburg, IN (US) 47025; Arvind G. Karandikar, 1875 Seven Oaks Dr., Morristown, TN (US) 37814

( * ) Notice: Subject to any disclaimer, the term of this patent is extended or adjusted under 35 U.S.C. 154(b) by 0 days.

(21) Appl. No.: 11/395,470

(22) Filed: Mar. 31, 2006

(65) Prior Publication Data

US 2007/0232177 A1    Oct. 4, 2007

(51) Int. Cl.
*D04H 1/56* (2006.01)
*B32B 27/32* (2006.01)
*B32B 25/10* (2006.01)

(52) U.S. Cl. .................. 442/400; 442/398; 428/296.7
(58) Field of Classification Search .............. 442/398, 442/400
See application file for complete search history.

(56) References Cited

U.S. PATENT DOCUMENTS

| 4,211,689 A | 7/1980 | Borman | 260/40 R |
|---|---|---|---|
| 4,295,652 A | 10/1981 | Saito et al. | 473/356 |
| 4,307,002 A | 12/1981 | Wagner et al. | 260/22 CB |
| 4,415,727 A | 11/1983 | Toga et al. | 528/272 |
| 5,324,612 A | 6/1994 | Maeda et al. | 430/109 |
| 5,916,677 A | 6/1999 | Chen et al. | 428/364 |
| 6,414,085 B1 | 7/2002 | Karas et al. | 525/168 |
| 2005/0154114 A1 * | 7/2005 | Hale | 524/436 |

FOREIGN PATENT DOCUMENTS

| DE | 934889 | 11/1955 | .................. 120/25 |
|---|---|---|---|
| GB | 847592 | 9/1960 | |

* cited by examiner

Primary Examiner—Lynda Salvatore
(74) Attorney, Agent, or Firm—Miles B. Dearth

(57) ABSTRACT

A meltblown web of polymeric polyester fibers, where the polyester polymer includes an aromatic dicarboxylic acid, a butanediol, and at least one additional branched or cycloaliphatic diol compound. The webs of the invention achieve high tensile strength values, and are particularly suitable for use as filter media.

13 Claims, 3 Drawing Sheets

HIGH-STRENGTH MELTBLOWN POLYESTER WEBS

FIELD OF INVENTION

The present invention relates to meltblown polybutylene ester nonwoven webs that exhibit high tensile strengths. The webs are made from fibers of a polyester copolymer which includes butanediol and at least one additional diol unit. The high strength values, and other beneficial properties, make the nonwoven webs particularly suitable for use as filter media.

BACKGROUND OF THE INVENTION

Polyester, and more particularly poly(butylene terephthalate) resin (PBT), is widely used to make meltblown nonwovens for applications such as filter media. PBT resins generally have good characteristics for meltblown processes; for example, thermal stability, fine fibers, and wettability. However, PBT meltblown webs have poor tensile strength, especially in the machine direction. In filter applications, the poor strength values require the web to be produced at prohibitive basis weights to maintain the integrity of the web. This is not practicable in the filter industry where the webs usually have to maintain a basis weight in the range of from 20 to 70 $g/m^2$, while having an MD strength of at least about 250 g/cm. Accordingly, most PBT meltblown filters include a support scrim that is attached to one side of the web. The use of scrim backing increases the production cost of polyester filters.

While most PBT resins may be meltblown into fibers with relatively small diameters (approximately 3.5 μm), it is desired to produce filters with even finer fibers. Other problems with PBT meltblown webs include poor fiber binding as evidenced by excessive fly (loose fiber tufts), and poor web stiffness. Here again, improvements are desired because the presence of fly on the web surface makes the web difficult to handle, and low web stiffness negatively effects pleating, which is desired in filter applications.

The use of poly(ethylene terephthalate) resins (PET) for nonwoven filter media is not desirable because PET fibers exhibit poor heat stability. Meltblown PET webs are unable to withstand continuous high temperature operating conditions (i.e., 120° C.). The ability to withstand high temperature environments is essential in certain filter applications, e.g., oil filters. Furthermore, PET webs exhibit excessive shrinkage or other thermal deformation when subjected to high temperature transient conditions which may occur in filter fabrication. This may occur, for example, when melt bonding the web to an endpiece.

It has surprisingly been found that the properties of PBT meltblown webs can be vastly improved by introducing at least one additional aliphatic diol into a PBT-based resin. As described herein, at least one branched or cycloaliphatic diol is included in a polybutylene ester resin in addition to an aromatic dicarboxylic acid and butanediol.

References of interest include DE 934889 to Roelen et al. (1955), GB 847592 to Birch et al. (1957), Linear Polyesters (Farbwerke Hoechst A. G. 1964, U.S. Pat. No. 4,211,689 to Borman; U.S. Pat. No. 4,295,652 to Saito et al., U.S. Pat. No. 4,307,002 to Wagner et al.; U.S. Pat. No. 4,415,727 to Toga et al., U.S. Pat. No. 5,324,612 to Maeda et al., U.S. Pat. No. 5,916,677 to Chen et al., and U.S. Pat. No. 6,414,085 to Karas et al.

SUMMARY OF INVENTION

The meltblown webs of the present invention exhibit remarkably high tensile strength values, particularly in the machine direction. This obviates the need for a scrim backing, and generally provides for a more economical meltblown product. Additionally, the inventive webs show a significant reduction in fly, which enables the webs to be efficiently and conveniently produced. Various aspects of the invention are summarized below and described in detail hereafter.

According to one aspect of the present invention there is provided a meltblown web of interbonded polyester fibers which are extruded through a multiple orificed die and attenuated by gas streams. The fibers include a polyester copolymer which comprises an aromatic dicarboxylic acid component and at least two diol components, where the total diol components include 60-99 mole percent diol component of a linear diol and 1-40 mole percent diol component of an additional diol component. The additional diol component includes aliphatic branched diols, cycloaliphatic diols, and combinations thereof. The composition of the polyester copolymer is chosen and the meltblown web is fabricated, such that the web has one or more of the following features:

(1) a machine direction strength index (defined below) in the range of from 3 to 15;
(2) a machine direction (MD)/cross-machine direction (CD) tensile strength ratio in the range of from 0.5 to 1.5; or
(3) a mean fiber diameter in the range of from 0.5 to 3.0 μm.

Still further features and advantages of the invention are apparent from the following description.

DETAILED DESCRIPTION

Figure 1:
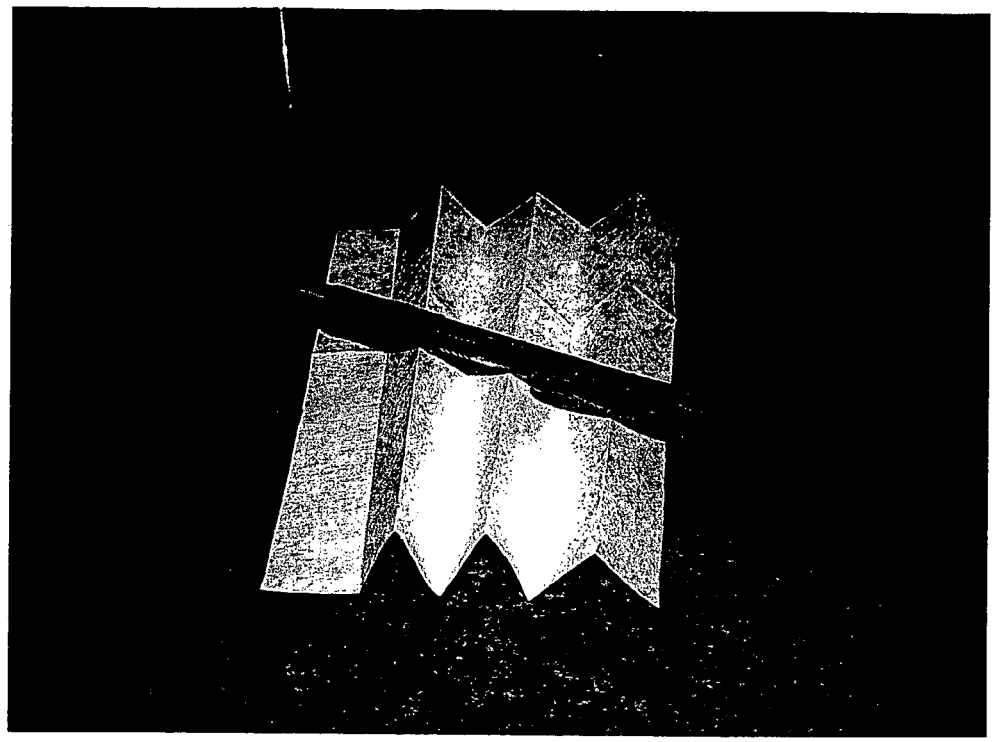
FIG. 1 is a photograph of a pleated web of the invention supporting a pen.

The invention is described in detail below with reference to numerous embodiments for purposes of exemplification and illustration only. Modifications to particular embodiments within the spirit and scope of the present invention, set forth in the appended claims, will be readily apparent to those of skill in the art.

Unless more specifically defined below, terminology as used herein is given its ordinary meaning.

The phrase "meltblown web," as used herein, refers to a web that is formed by extruding molten thermoplastic material through a plurality of small holes to form molten fibers, and attenuating the molten fibers with high velocity gas streams. The fibers are then deposited on a collecting surface to form the meltblown web.

"Fly" refers to tufts of loose fibers which may appear on both surfaces of a meltblown nonwoven web (die side and belt side). The amount of fly is determined by counting the number of loose fiber tufts on each side of the web and dividing by the area of the web. The results are reported for the die side and the belt side in $tufts/cm^2$.

The "intrinsic viscosity," or "I.V.," as used in the present application, relates to the degree of polymerization of the polymer, and is measured on a 4 percent solution of the polymer (extrapolated to zero) in o-chlorophenol at 25° C.

The "MD strength index" of a web is defined as its machine direction tensile strength in g/cm, divided by the basis weight of the web in g/m². Likewise, the "CD strength index" is the cross-machine direction tensile strength of the web (g/cm) divided by the basis weight (g/m²). For both properties, the tensile strength of the web is measured according to ASTM D5035-95 using INSTRON® with 10 lb load cell at a constant rate of extension 12 in/min. The MD and CD tensile strength is reported as the average load to break of 5, 1 in. wide by 10 in. long, cut strip samples where the length of the sample is along the MD direction for MD tensile strength, and along the CD direction for CD tensile strength. The amount of elongation is also determined using the ASTM D5035-95 procedure. For the purposes of this invention, the strength index and elongation are characteristics of the meltblown polyester web. Accordingly, the tests should be performed on a sample web which includes self-bonded polyester copolymer fibers, i.e., no adhesive binder is present.

The polyester resins used to form the meltblown webs of the invention include an aromatic dicarboxylic acid (or derivative thereof), a linear diol, and at least one additional aliphatic branched or cyclic diol. The polyester resins may include poly(butylene terephthalate) based polymers (PBT) or poly(butylene napthalate) based polymers (PBN), where the resins are modified with one or more additional aliphatic diols.

Very generally, the polyester copolymer is obtained by reacting (A) an aromatic dicarboxylic acid component or a derivative thereof with (B) a diol component comprising (B-1) 60 to 99 mole % diol component of butanediol, and (B-2) 1 to 40 mole % diol component of a branched aliphatic diol having 4 to 16 carbon atoms and/or a bulky cycloaliphatic diol. The diol component may include in further embodiments 70 to 99 mole % diol component of the linear aliphatic diol, and 1 to 30 mole % diol component of the additional branched and/or cyclic aliphatic diol. In preferred embodiments, the branched and/or aliphatic diol is present in amounts of from 2-20 mole % diol component. As recited herein, the amounts of each component of the polyester copolymer are preferably determined by NMR analysis; if necessary, other suitable methods may be used, e.g., hydrolysis (methanolysis) or chromatography of the hydrolysate.

The aromatic dicarboxylic acid component or its derivative (A) includes aromatic diacids, their derivatives, and combinations thereof. The aromatic dicarboxylic acids may include terephthalic acid, naphthalene dicarboxylic acid, their derivatives and combinations thereof. "Derivatives" of the dicarboxylic acid, include anhydrides, acid chlorides, the carboxylic acid themselves, and the lower alkyl ester ($C_1$ to $C_6$) or half esters or mixed (e.g., chloride-esters) of these. The dicarboxylic acid component (A) is generally present in the polyester copolymer in about an equimolar amount with the diol component (B); although an excess of diol is usually charged to the reactor to drive the reaction. Especially preferred aromatic dicarboxylic acid components include terephthalic acid, dimethyl terephthalate, terephthaloyl chloride, 2,6-naphthalene dicarboxylic acid, and dimethyl naphthalate. Suitably, the polyester copolymer includes terephthalic acid or its derivatives in amounts of at least 90 mole percent of the diacid component, or the resin includes 2,6-napthalene dicarboxylic acid or its derivatives in amounts of at least 90 mole percent of the diacid component, or the resin includes a combination of terephthalic acid, 2,6-naphthalene dicarboxylic acid, or their derivatives in amounts of at least 90 mole percent of the diacid component. The structures of terephthalic acid and 2,6-napthalene dicarboxylic acid are illustrated below.

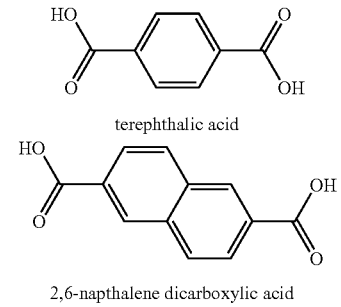

terephthalic acid 2,6-napthalene dicarboxylic acid

The polyester resin used in the invention further includes random repeating units of at least two diol components (B-1) and (B-2). The first diol component (B-1) is a linear $C_4$-$C_{16}$ aliphatic diol including butanediol, hexanediol, and the like. The preferred linear aliphatic diol is butanediol. The linear aliphatic diol comprises 60-99 mole % of the total diol components used in the polyester copolymers.

The polyester copolymer also includes an additional aliphatic diol component (B-2) which may be present in amounts of from 1-40 mole % of the total diol components in the resin. The additional aliphatic diol is selected from the group of branched diols, cycloaliphatic diols, and combinations thereof. Accordingly, one or both of the branched or cyclic diols may be used. Where the branched diol is included, it is preferably present in amounts of from 2-20 mole % of the total diol components (B). Where the cyclic diol is included it is preferably present in amounts of from 2-10 mole % of the total diols.

The branched diols include $C_4$-$C_{16}$ aliphatic branched diols. Suitably, the branched diol has 4-12 carbon atoms, 4-10 carbon atoms, or 4-8 carbon atoms. Exemplary branched diols include 2-methyl-1,3-propanediol, 2,2-dimethyl-1,3-propanediol, 2-butyl-2-ethyl-1,3-propanediol, trimethylpentanediol, and the like. Most preferred are $C_4$-$C_5$ branched aliphatic diols such as 2-methyl-1,3-propanediol and 2,2-dimethyl-1,3-propanediol. The structures of exemplary branched diols are illustrated below:

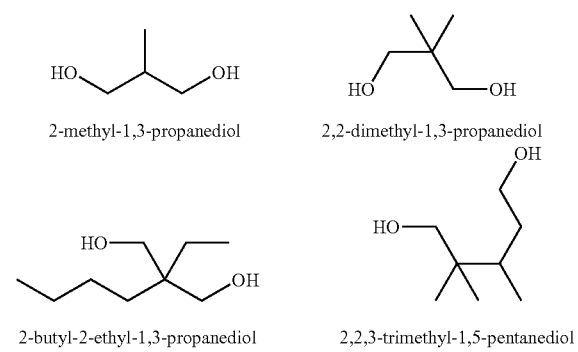

2-methyl-1,3-propanediol    2,2-dimethyl-1,3-propanediol 2-butyl-2-ethyl-1,3-propanediol    2,2,3-trimethyl-1,5-pentanediol The cycloaliphatic diol compound may include cycloaliphatic diols which have between 6-20 carbon atoms, with the proviso that if a cyclohexane diol is used, it is included with at least one additional cyclic or branched diol.

For example, a mixture of (cis, trans) 1,3-cyclohexanedimethanol and (cis, trans) 1,4 cyclohexanedimethanol is contemplated for use in the present invention (commercially available as UNOXOL™ from Dow Chemical Company). More typically, the cycloaliphatic diol compound has from 6 to 15, or from 9 to 15 carbon atoms in the cyclic moiety. The cycloaliphatic diol may also be a polycyclic compound. Exemplary cycloaliphatic diols include dimethyloltricyclodecane, tricyclo[3.3.1.13,7]decane-1,3-dimethanol, 3-(hydroxymethyl)-γ,4-dimethyl-cyclohexanepropanol (commercially available as LIMONENE ALCOHOL DM™ from Celanese Chemicals), 3(4),8(9)-dihydroxymethyl-tricyclo[5.2.1.02,6]decane (also referred to as "tricyclodecane dimethanol," commercially available as TCD ALCOHOL DM™ from Celanese (Dallas Tex.), and the like. TCD alcohol DM is preferred, and is believed to have the following structure:

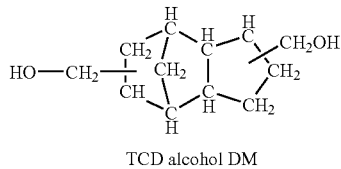

TCD alcohol DM

In some embodiments, the polyester copolymer may include both the branched and cycloaliphatic diol in additional to the linear diol. If both branched and cycloaliphatic diol components are included, they may be present in suitable ratios of from 10:1 to 1:1, or 2:1 to 5:1, respectively. Indeed, in some aspects of the invention there is provided a novel polyester copolymer which comprises terephthalic acid or its derivatives, and a combination of diols including 60-99 mole % diol component of $C_4$-$C_{16}$ linear diols, 1-39 mole % diol component of a cycloaliphatic diol with 6-20 carbon atoms in the cyclic moiety, and 1-39 mole % diol component of a $C_4$-$C_{10}$ branched diol.

Additional components may be included in the polyester composition according to need, as are well known in the art. Suitable additives include an oxidation stabilizer, a heat stabilizer, a colorant, an ultraviolet absorbent, and the like.

The polyester copolymers produced according to the present invention should have properties suitable for meltblown processes and nonwoven applications. If the polyester used to make the meltblown webs is a terephthalate resin, it may have a melting point in the range of from 200-220° C. If the polyester used is a naphthalate resin, it may have a melting point in the range of from 220-240° C. The polyester resins may have an intrinsic viscosity (I.V.) in the range of from 0.5 to 0.8 dl/g. If the intrinsic viscosity of the polyester constituting the meltblown webs of this invention is lower than 0.5, the polymer produces molten fibers with melt strengths that are too low for attenuation—the fibers tend to break under the high velocity gas streams. Additionally, if the intrinsic viscosity is in excess of 0.8, the polymer is too viscous to be extruded through the die orifices.

According to the invention, the polyester copolymers described above are meltblown to produce a nonwoven web. Meltblown processes include heating the polymer until it is molten, and extruding the resin through a plurality of small capillaries (typically 0.3 to 0.5 mm in diameter) to form molten polymer fibers. The molten fibers are directly contacted with converging streams of high-velocity heated gas (usually air) which attenuates the fibers. Most of the fibers are then collected on a moving belt or wire to form an interbonded web. The die may be separated from the collection belt by a distance of about 10 cm or greater; this is referred to as the die to collector distance (DCD). A suction device may be positioned on the opposite side of the collection belt to aid in depositing the fibers on the belt. The speed of the collector belt is adjusted to achieve the desired basis weight. Typically, the collection belt is operated at speeds of from 10 to 150 ft/min, where the higher belt speeds correspond to lower basis weight webs. The webs of the invention may have basis weights in the range of from 10 to 70 g/m².

The thickness of the fibers may be controlled by adjusting the polymer throughput of the extruder and/or the degree of attenuation of the fibers. Higher polymer throughput generally produces webs with higher fiber diameter, and vice versa. The extruder is operated to provide a polymer delivery rate in the range of from 0.2 to 1.0 g/hole/minute. The fiber diameter may also be varied by controlling the degree of attenuation of the fibers. In meltblown processes the fibers are attenuated to an average draw ratio of 50 up 250, usually 75 up to 200. The "draw ratio" is the ratio of the diameter of the extrusion orifice to the mean diameter of the attenuated fibers. The fiber thickness in the inventive webs may be controlled such that the mean fiber diameter is in suitable ranges of from 0.5 to 10 µm, or for finer fibers 0.5 to 3.0 µm or 1.0 to 2.5 µm. Other processing parameters may be adjusted to achieve the desired properties of the meltblown web as is well known in the art; variables include extrusion pressure, extrusion temperatures, air flow rate, air temperature, vacuum pressure, and the like. Preferably, adhesive binders are not added to the webs of the invention, such that the webs are entirely self-bonded.

Note, that meltblown processes are distinguishable from spunbond processes in several aspects-notably, spunbond processes cool the fibers prior to attenuation and generally produce fibers with larger diameters than are produced by meltblown processes. For example, whereas the average draw ratio in meltblown processes is in the range of 50 to 250, spunbond processes attenuate the fibers such that they have an average total draw ratio (spinning and drawing) of only about 20 to 25.

As mentioned above, the webs of the invention achieve remarkably high strength properties, particularly in the machine direction. For example, the inventive webs typically exhibit an MD strength index (MD tensile strength/basis weight) in the range of from 3 or 4 to 15, with suitable MD strength indexes being in ranges of from 6 to 15, 8 to 12, or even from 10 to 12. The CD strength is also generally improved as well, with CD strength indexes being in the range of from 6 to 15, or from 8 to 12. The meltblown webs of the invention are surprisingly relatively isotropic with respect to tensile strength. For example, while conventional PBT meltblown webs typically exhibit an MD/CD strength ratio of less than 0.35, the inventive webs have MD/CD strength ratios in the range of from 0.5 to 1.5, preferably from 0.6 to 1.2. In some instances, the MD/CD tensile ratios in the inventive web may be in the range of from 0.8 to 1.2.

Additionally, the inventive webs may exhibit elongation values in the machine direction of from 10 to 80 percent. In some instances, the MD elongation of the inventive webs is in the range of from 40 to 80 percent. The webs of the invention may also exhibit an increase in elongation in the cross-machine direction of from 40 to 90 percent.

Figure 2:
FIG. 2 is a photograph of a pleated web made from conventional PBT fibers supporting a pen.
Figure 3:
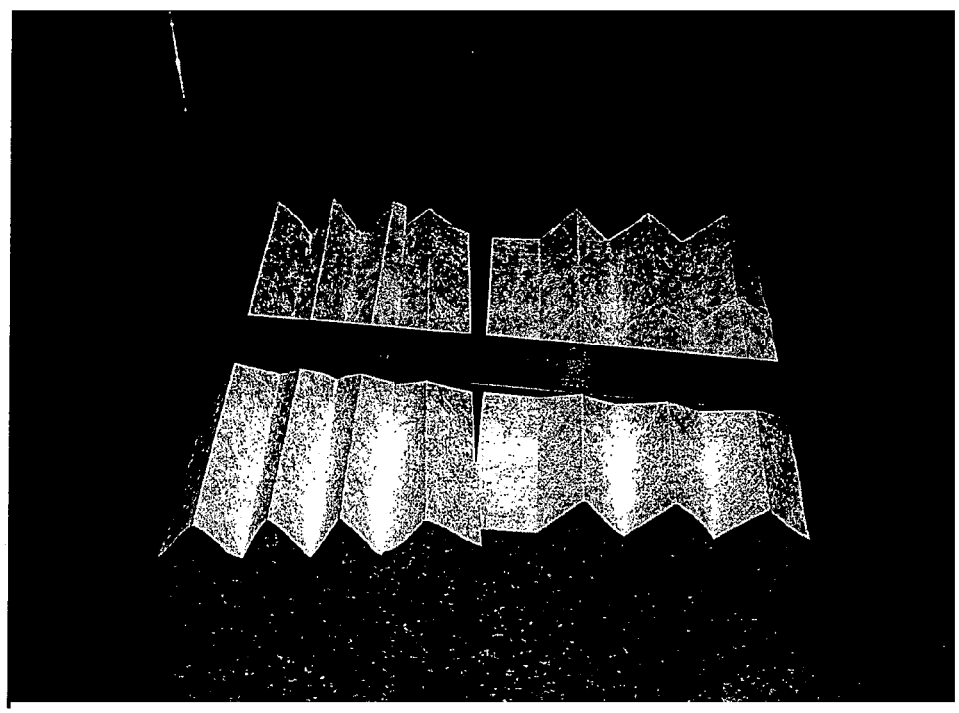
FIG. 3 is a photograph of two pleated webs of the invention supporting a scale.
Figure 4:
FIG. 4 is a photograph of two pleated webs made from conventional PBT fibers supporting a scale.
Figure 5:
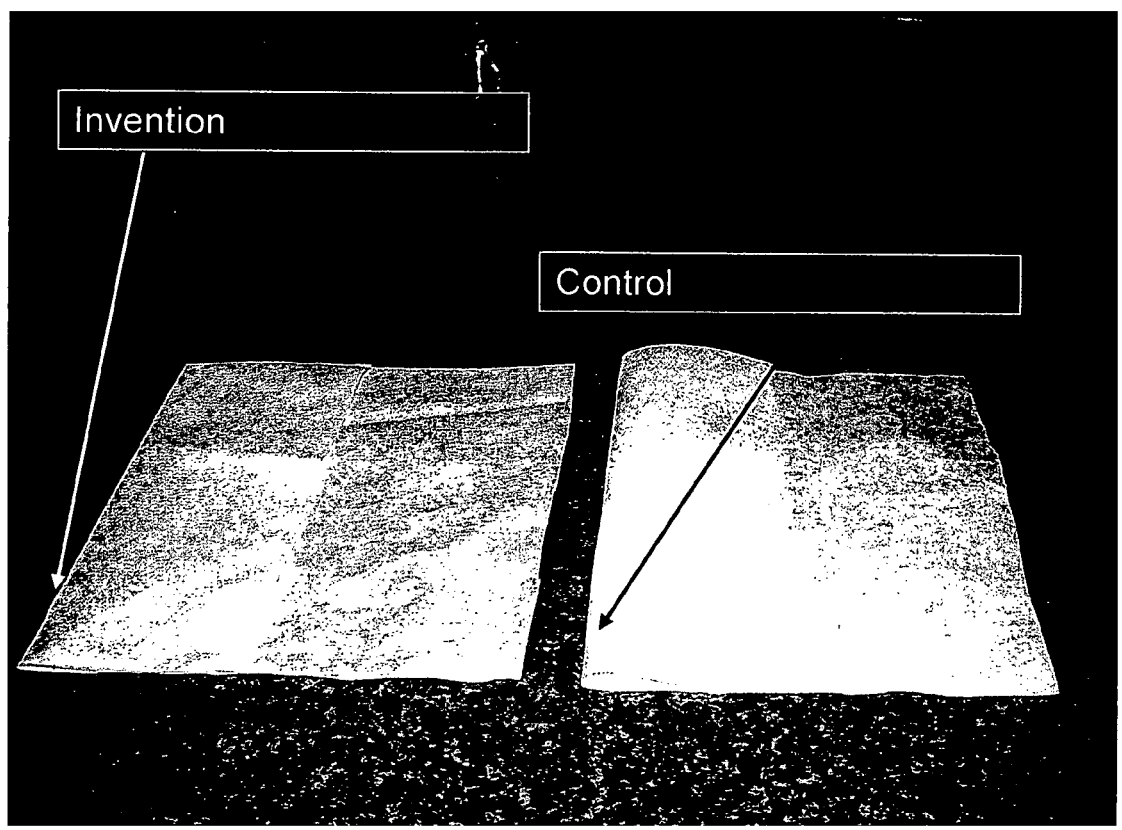
FIG. 5 is a photograph of a folded web of the invention, and a folded web made from conventional PBT fibers.

FIGS. 1-5 illustrate further advantages of the present invention. As can be seen in FIGS. 1 and 2, a web made according to the present invention (FIG. 1) has significantly less fly than a conventional meltblown polyester web (FIG. 2). Additionally, it can be seen that the pleated web of the invention does not buckle when supporting a weight. Accordingly, the inventive webs are believed somewhat stiffer than the comparative web. This is additionally shown in FIG. 3 (invention) and FIG. 4 (comparative) where the conventional web exhibits significant buckling compared to the web of the invention. FIG. 5 shows a folded web of the present invention (left side) and a folded conventional web (right side). As can be seen, the inventive web exhibits a "dead fold" such that it folds flat, whereas the conventional web does not. This is an important feature which shows that the meltblown web of the invention pleats well.

The meltblown webs produced according to the invention are particularly suitable for use as filter media. Suitable filters for various gas and liquid applications include oil filters, gas filters, diesel filters, blood filters, exhaust filters, and air filters for home or car ventilation. Advantageously, the filters may be pleated as is described in U.S. Pat. No. 6,585,838 to Mullins et al., the entirety of which is incorporated herein by reference. For filter applications, the web may have an air permeability in the range of from 1,000 to 3,000 l/min as measured according to ASTMD737-96.

As mentioned above, conventional filter media are produced and used with a support scrim which is a fabric backing that is attached to the nonwoven meltbown web to provide support and strength to the web. This is particularly common in filters which have a low basis weight, such as from 15 to 30 gsm. In contrast, the webs of the invention are self-supporting even at low basis weights, and have enough strength to support their own weight and undergo fabrication processing without a support scrim. Thus, the webs of the invention "consist essentially" of the meltblown structure without a supporting scrim or fabric.

Further features of the invention are illustrated in the examples which follow.

EXAMPLES

For purposes of illustration, the polymerization procedure used to produce three polyester resins of the invention is described briefly.

Polymer A

Polyester copolymers were prepared in a 50-Gallon batch reactor with a helical agitator. Dimethyl terephthalate (DMT) 67.35 Kg, 1,4-butanediol (BDO) 39.84 Kg, 2-methyl-1,3-propanediol (MPDIOL®) 2.34 Kg, and 16.3 g tetra-n-butyl titanate were charged into the reactor while the reactor is purged with dry nitrogen. The reactor was heated to 200° C. The ester-interchange reaction was considered to be complete when more than 95% of the theoretical methanol had been collected. The reactor temperature was increased to 250° C. while the reactor pressure was gradually reduced to 0.1 mmHg over a period of 50 minutes. The polymerization mass is agitated at 245-250° C./0.04 mmHg until a specific agitator torque was reached. The polymer melt mass was extruded and cut into pellets. About 72 Kg polyester copolymer was obtained, which had an intrinsic viscosity of 0.67 dl/g. It was determined by NMR analysis that the diol composition in the copolymer was 95.2 mol % BDO and 4.8 mol % MPDIOL®.

Polymer B

Polyester copolymers were prepared in a 50-Gallon batch reactor with a helical agitator. Dimethyl terephthalate (DMT) 61.11 Kg, 1,4-butanediol (BDO) 36.86 Kg, TCD ALCOHOL DM™ 4.25 Kg, and 15.2 g tetra-n-butyl titanate were charged into the reactor while the reactor is purged with dry nitrogen. The reactor was heated to 200° C. The ester-interchange reaction was considered to be complete when more than 95% of the theoretical methanol had been collected. The reactor temperature was increased to 250° C. while the reactor pressure was gradually reduced to 0.1 mmHg over a period of 50 minutes. The polymerization mass is agitated at 245-250° C./0.04 mmHg until a specific agitator torque was reached. The polymer melt mass was extruded and cut into pellets. About 68 Kg polyester copolymer was obtained, which had an intrinsic viscosity of 0.64 dl/g. It was determined by NMR analysis that the diol composition in the copolymer was 93.6 mol % BDO and 6.4 mol % TCD ALCOHOL DM™.

Polymer C

Polyester copolymers were prepared in a 50-Gallon batch reactor with a helical agitator. Dimethyl terephthalate (DMT) 62.11 Kg, 1,4-butanediol (BDO) 32.41 Kg, 2-methyl-1,3-propanediol (MPDIOL®) 5.76 Kg, TCD ALCOHOL DM™ 2.45 Kg, and 15.2 g tetra-n-butyl titanate were charged into the reactor while the reactor is purged with dry nitrogen. The reactor was heated to 200° C. The ester-interchange reaction was considered to be complete when more than 95% of the theoretical methanol had been collected. The reactor temperature was increased to 250° C. while the reactor pressure was gradually reduced to 0.1 mmHg over a period of 50 minutes. The polymerization mass is agitated at 245-250° C./0.04 mmHg until a specific agitator torque was reached. The polymer melt mass was extruded and cut into pellets. About 68 Kg polyester copolymer was obtained, which had an intrinsic viscosity of 0.64 dl/g. It was determined by NMR analysis that the diol composition in the copolymer was 85.2 mol % BDO, 10.8 mol % MPDIOL® and 4 mol % TCD ALCOHOL DM™.

The three polyester copolymers produced above were meltblown into nonwoven webs according to a conventional meltblown process. Polymer C was used to produce two meltblown webs (corresponding to Examples C-1 and C-2), each having a different average fiber thickness. The following recommended process settings were used to produce the meltblown webs of the invention.

TABLE 1

| Meltblown Parameters | |
|---|---|
| Meltblown Parameters | Recommended Settings |
| Extruder Temperature Profile (° C.) | For maximum throughput setting of 1.0 g/hole/min |
| Zone 1 | 240-260 |
| Zone 2 | 260-270 |
| Zone 3 | 270-285 |
| Zone 4 | 270-285 |
| Zone 5 | 270-285 |
| Die Melt Temperature (° C.) | 270-285 |
| Extruder Outlet Pressure (kPa) | 3400-4100 |
| Polymer Delivery Rate (g/hole/min) | 0.2-1.0 |
| Process Air | |
| Air Temp. (° C.) | 290-300 |
| Air Flow rate (kg/h) | 2420-5280 |
| Quench Air | As necessary |
| Die to Collector Distance (cm) | 15-30 |
| Belt Speed (ft/min) | 10-150 |
| Converter Vacuum Pressure (cm water) | 25.4-50.8 |

In Examples A-C2, the belt speed was adjusted so that the webs had basis weights of approximately 40 g/m².

The webs produced according to examples A-C2 were tested for a variety of properties including fiber diameter, fly, air permeability, tensile strength (CD and MD), and elongation at break. For purposes of comparison, a commercially available web was tested as the control. The control web is made from fibers of a poly(butylene terephthalate) homopolymer, i.e. including only the terephthalic acid and butanediol; the PBT control resin is commercially available as CELANEX® 2008 by Ticona (I.V. about 0.56 dl/g).

The fiber diameter of the web is determined using a Scanning Electron Micrograph (SEM) as is known in the art; however, any suitable method may be used. The SEM measures the minimum diameter, maximum diameter, number mean diameter, and the standard deviation of 100 filament readings.

Fly is measured by counting the loose fiber tufts on both surfaces of the meltblown webs (die side and belt side), per unit of web area.

The tensile strength values and elongation at break are measured according to ASTM D5035-95 on INSTRON® with 10 lb load cell at a constant rate of extension 12 in/min. The CD and MD tensile strength is reported as the average load to break of 5, 1 in. wide by 10 in. long cut strip samples, where the length is parallel to the reported direction (either CD or MD). As noted above, the MD and CD strength indexes are determined by dividing the tensile strength in g/cm, by the basis weight of the web in $g/m^2$.

TABLE 2

Web Properties

| | Example | | | | |
|---|---|---|---|---|---|
| | Control | A | B | C1 | C2 |
| Web Thickness (mils) | 12.3 | 12.5 | 11.6 | 10.9 | 11.1 |
| Basis Weight (g/m²) | 40 | 40 | 40 | 40 | 40 |
| Fiber Diameter (μm) | | | | | |
| min. | 0.6 | 1.3 | 0.5 | 1.1 | 0.6 |
| max. | 12.0 | 7.9 | 9.2 | 7.4 | 7.7 |
| std. | 2.1 | 1.6 | 1.7 | 1.5 | 1.1 |
| mean | 3.7 | 3.4 | 4.0 | 3.5 | 1.9 |
| Draw ratio | 95 | 103 | 87 | 100 | 184 |
| Fly, Die Side/Belt Side (bunches/cm²) | 0.71/0.31 | 0.74/0.34 | 0.06/0 | 0.25/0.12 | 0.31/0 |
| Air Permeability, (l/min) | 2209 | 1926 | 2634 | 2690 | 1274 |
| MD tensile strength (gm/cm) | 71 | 232 | 375 | 375 | 411 |
| Elongation at break (%) | 3 | 6 | 41 | 62 | 16 |
| MD strength index (MD strength/basis wt.) | 1.78 | 5.80 | 9.38 | 9.38 | 10.28 |
| CD tensile strength (gm/cm) | 214 | 339 | 393 | 411 | 411 |
| Elongation at break (%) | 40 | 41 | 71 | 82 | 47 |
| CD strength index (CD strength/basis wt.) | 5.35 | 8.48 | 9.83 | 10.28 | 10.28 |
| MD/CD tensile strength ratio | 0.33 | 0.68 | 0.95 | 0.91 | 1.0 |

As can be seen from the above table, the webs of the invention have surprising strength values in the machine direction—in some cases greater than 5 times the strength of conventional webs. Likewise, it is seen that the CD strength is generally increased by a factor of 1.5 or more. The webs of the invention are similarly improved with respect to the elongation at break and the amount of fly. The elongation achieved by the inventive webs is substantially higher than conventional PBT webs, in some cases exceeding the control sample by factors of more than 2 times, 3 times, or even 20 times. The improvements with respect to fly are also apparent, with more than 90 percent reduction in fly being achieved in some cases.

While the invention has been illustrated in connection with several examples, modifications to these examples within the spirit and scope of the invention will be readily apparent to those of skill in the art. In view of the foregoing discussion, relevant knowledge in the art and references discussed above in connection with the Background and Detailed Description, the disclosures of which are all incorporated herein by reference, further description is deemed unnecessary.

What is claimed is:

1. A meltblown web comprising interbonded fibers extruded through a die with multiple orifices and attenuated by gas at a predetermined velocity to an average draw ratio of above 50, up to 250, said fibers including a thermoplastic polyester poly (butylene terephthalate) based copolymer which comprises:
   A) an aromatic dicarboxylic acid component or derivative thereof, which is selected from group consisting of terephthalic acid and its derivatives; and
   B) at least two diol components, including:
      i) 60-99 mol percent diol component of butanediol; and
      ii) 1-40 mol percent diol component of at least one additional aliphatic diol component selected from the group consisting of $C_4$-$C_{12}$ aliphatic branched diols, cycloaliphatic diol compounds having from 6-20 carbon atoms in the cyclic moiety, and combinations thereof, with the proviso that if 1,4-cylcohexane dimethanol is used as the cycloaliphatic diol, it is used in combination with another cyclic or branched diol,
   wherein the copolymer composition is selected and formation of the meltblown web is controlled such that the melt-blown web exhibits at least one of the following attributes:
      1) a machine direction (MD) strength index in the range of from 3 to 15;
      2) an MD/CD tensile strength ratio in the range of from 0.5 to 1.5; or
      3) a mean fiber diameter in the range of from 0.5 to 3.0 μm.

2. The meltblown web according to claim 1, wherein the additional aliphatic diol component is selected from the group consisting of $C_4$-$C_5$ branched diols, polycyclic aliphatic diol compounds with 9-15 carbon atoms in the cyclic moiety, and combinations thereof.

3. The meltblown web according to claim 1, wherein the additional aliphatic diol component is selected from the group consisting of a mixture of (cis, trans) 1,3- and 1,4-cyclohexanedimethanol, dimethyloltricyclodecane, tricyclo [3.3.1.13,7]decane-1,3-dimethanol, 3-(hydroxymethyl)-γ,4-dimethyl-cyclohexanepropanol, tricyclodecane dimethanol, and combinations thereof.

4. The meltblown web according to claim 1, wherein the additional aliphatic diol component is selected from the group consisting of 2-methyl-1,3-propanediol, 2,2-dimethyl-1,3-propanediol, 2-butyl-2-ethyl-1,3-propanediol, trimethylpentanediol, and combinations thereof.

5. The meltblown web according to claim 1, wherein the additional aliphatic diol component includes both a $C_4$-$C_{12}$ branched diol and a cycloaliphatic diol with 6-20 carbon atoms in the cyclic moiety.

6. The meltblown web according to claim 1, wherein the polyester copolymer consists essentially of terephthalic acid or its derivatives, 1,4-butanediol, and one or both of 2-methyl-1,3-propanediol and tricyclodecane dimethanol.

7. The meltblown web according to claim 1, wherein the web exhibits an MD strength index in the range of from 6 to 15.

8. The meltblown web according to claim 1, wherein the web exhibits a CD strength index in the range of from 6 to 15.

9. The meltblown web according to claim 1, wherein the web exhibits an MD/CD tensile strength ratio in the range of from 0.6 to 1.2.

10. The meltblown web according to claim 1, wherein the polyester fibers have a mean diameter in the range of from 1 to 2.5 µm.

11. The meltblown web according to claim 1, wherein the web has from 0 to 0.5 bunches of fly per cm$^2$ on at least one of the die side or belt side of the web.

12. The meltblown web according to claim 1, wherein the web exhibits an elongation at break in the machine direction of from 10 to 80 percent.

13. A meltblown web consisting essentially of polybutylene terephthalate (PBT) based copolymer fibers, wherein the PBT based copolymer includes terephthalic acid or its derivatives, 1,4-butanediol, and at least one branched or cycloaliphatic diol, wherein the copolymer composition is selected and the formation of the meltblown web is controlled such that the melt-blown web exhibits an MD/CD tensile strength ratio of in the range of from 0.5 to 1.5.

* * * * *